United States Patent [19]

Sattaripour

[11] 4,117,496
[45] Sep. 26, 1978

[54] EARTHQUAKE RECORDING DEVICE

[76] Inventor: Ali Sattaripour, P.O. Box 85, Tehran, Iran

[21] Appl. No.: 835,915

[22] Filed: Sep. 23, 1977

[51] Int. Cl.² ............... G01D 9/04; G01D 15/16; G01V 1/16
[52] U.S. Cl. .................................. 346/7; 346/44; 346/112; 340/17
[58] Field of Search ............ 346/7, 44, 112, 115

[56] References Cited

U.S. PATENT DOCUMENTS

| | | | |
|---|---|---|---|
| 2,959,459 | 11/1960 | Ryan | 346/7 |
| 3,183,512 | 5/1965 | Castle | 346/7 |
| 3,795,006 | 2/1974 | Engdahl et al. | 346/7 |
| 3,974,504 | 8/1976 | Engdahl | 346/7 |

Primary Examiner—George H. Miller, Jr.

[57] ABSTRACT

An earthquake recording device in which magnetically damped compound pendulums support smoked glass lenses. The natural frequencies of the pendulums are different. The points of stylus arms rests upon the smoked glass lenses and trace the pattern of movement produced by earthquake shocks on the lens surfaces. A timing device lifts the stylus arms periodically so that a time scale is provided on the tracing on the smoked glass.

6 Claims, 11 Drawing Figures

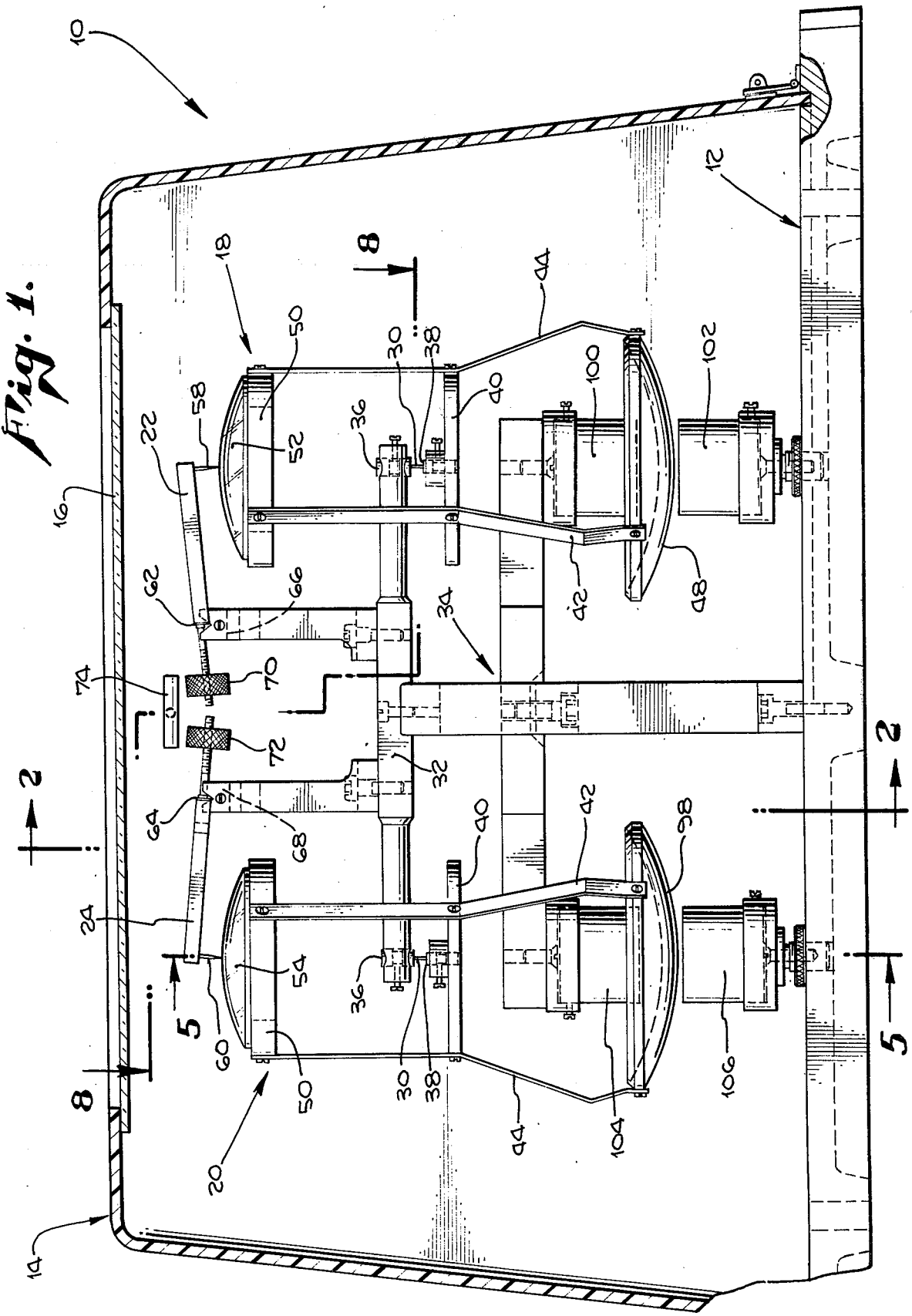

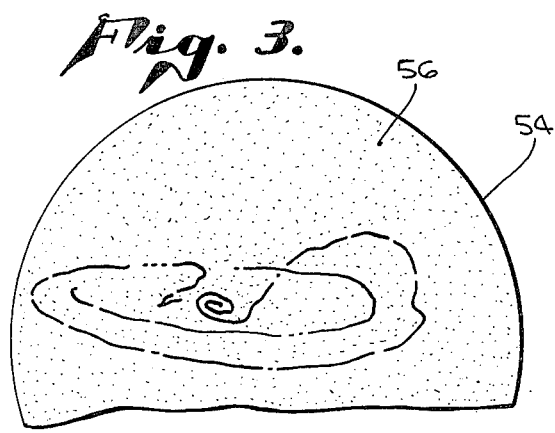
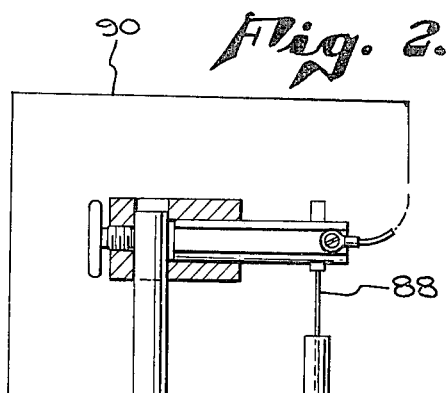
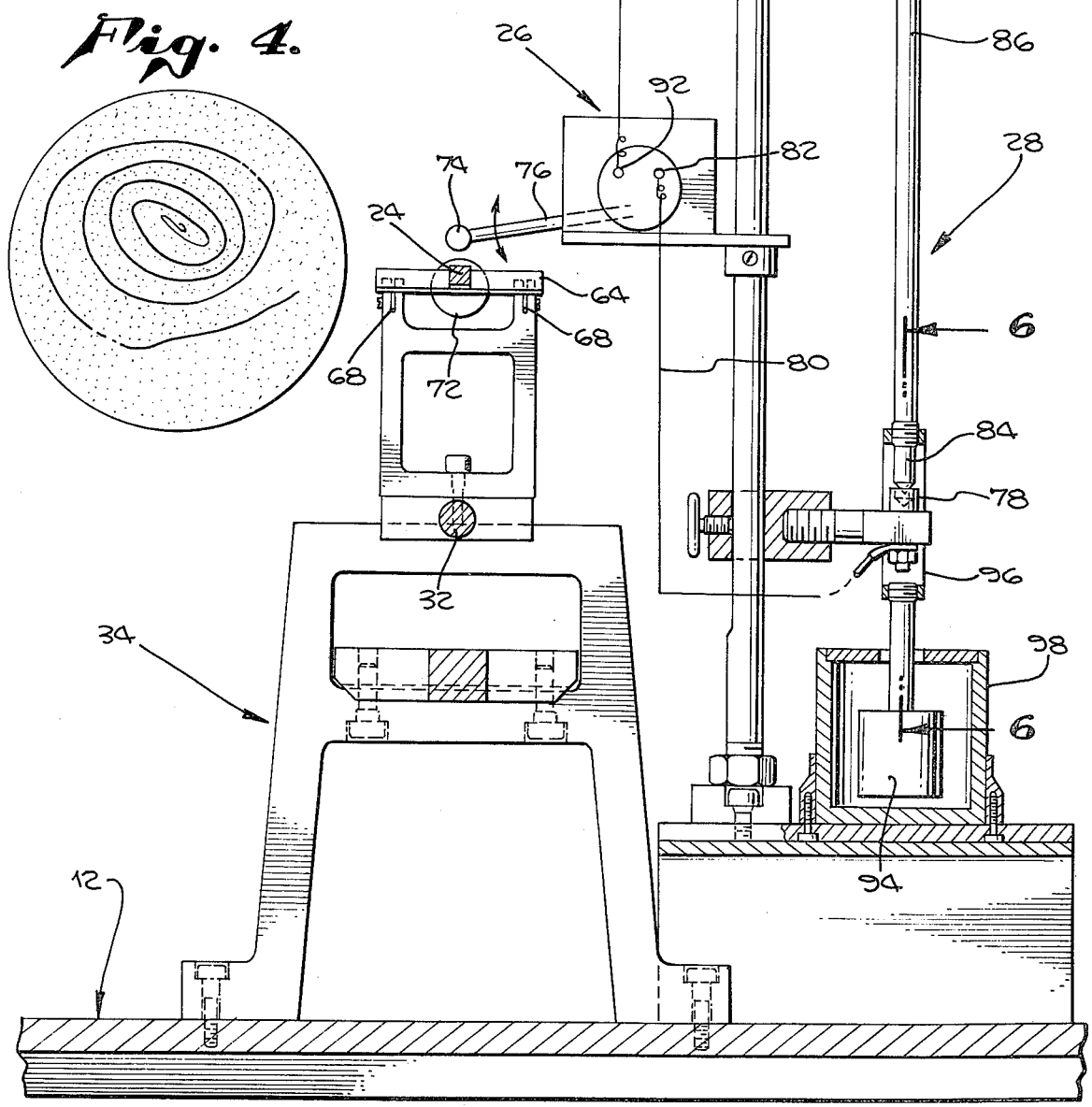

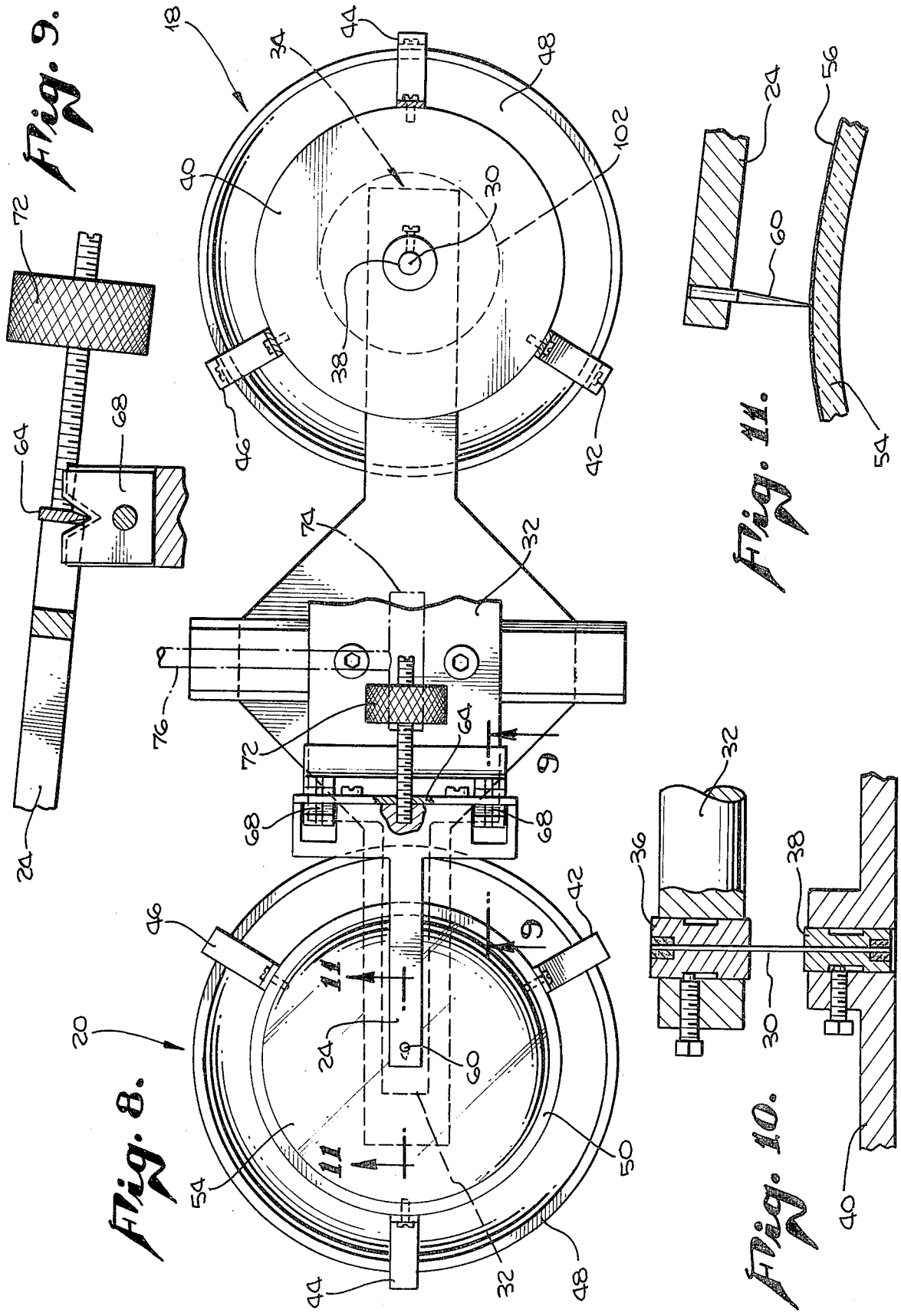

EARTHQUAKE RECORDING DEVICE

This invention relates to shock recording devices and in particular to earthquake shock recording devices.

Previously considerable difficulty had been experienced in obtaining a complete and accurate record of earthquake shocks. Earthquake shocks occur at irregular intervals at unpredictable locations. The recording of earthquakes has been less than satisfactory because complete and adequate information has not been available from previous recording devices.

According to the present invention a device is provided which is simple, inexpensive, and accurate in providing the information which is needed for the proper analysis of an earthquake. The provision of two compound pendulums permits one pendulum to be calibrated to record small shocks while the other pendulum is calibrated to record large shocks. The provision of a means for providing a time scale on the record generated by the motion of the compound pendulums during an earthquake permits the record thus produced to be used in calculating the response spectrum curve for the earthquake.

The shock recording device according to the present invention includes a base which is intended to be mounted rigidly in concrete, two magnetically damped pendulums which are supported at only one point so as to permit omnidirectional movement about that point, styluses mounted so as to scribe a pattern on a lens mounted on the respective pendulums, and a timing device which imparts regularly spaced impulses to the styluses so as to lift their points momentarily free of contact with the surface of lens while the pendulums are in motion. The intervals between the impulses which are delivered to the styluses by the timing devices are established at predetermined values so that the styluses scribe broken lines on the lenses. This provides a time record of the ground motion in an earthquake. The point at which the pendulums are supported take the motion of the ground or of the structure to which the device is mounted. The known characteristics of the pendulums together with the record recorded by the motion of the pendulum during an earthquake, permit the calculation of the velocity response spectrum curve.

The accompanying drawings are provided for the purposes of illustration and not limitation.

In the drawings there is illustrated:

FIG. 1 is a partial cross-sectional elevational view of an earthquake recording device according to the present invention;

FIG. 2 is a cross-sectional side elevational view taken along line 2—2 in FIG. 1;

FIG. 3 is an illustration of the record produced by a recording device according to the present invention;

FIG. 4 is a record produced by a recording device without utilizing any timing device;

FIG. 8 is a view taken along line 8—8 in FIG. 1;

FIG. 9 is a cross-sectional view taken along line 9—9 in FIG. 8;

FIG. 10 is a cross-sectional view taken along line 10—10 in FIG. 5; and

FIG. 11 is a cross-sectional view taken along line 11—11 in FIG. 8.

Figure 6:
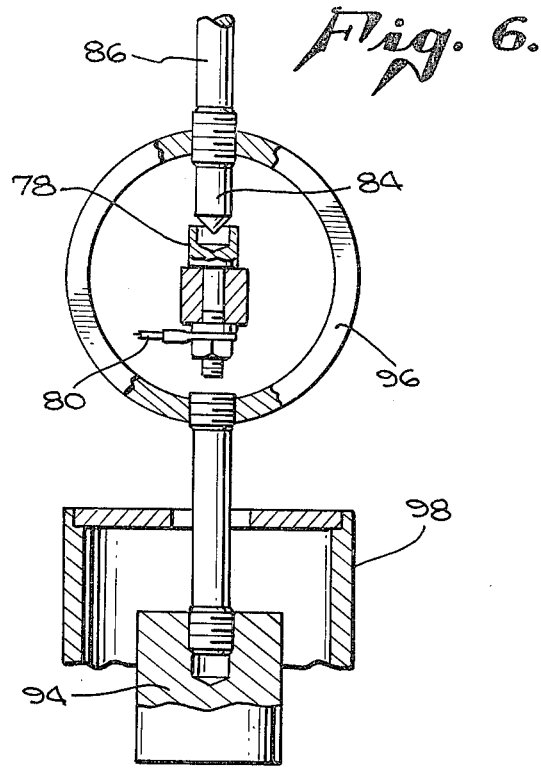
FIG. 6 is a partial cross-sectional view taken along line 6—6 in FIG. 2.
Figure 5:
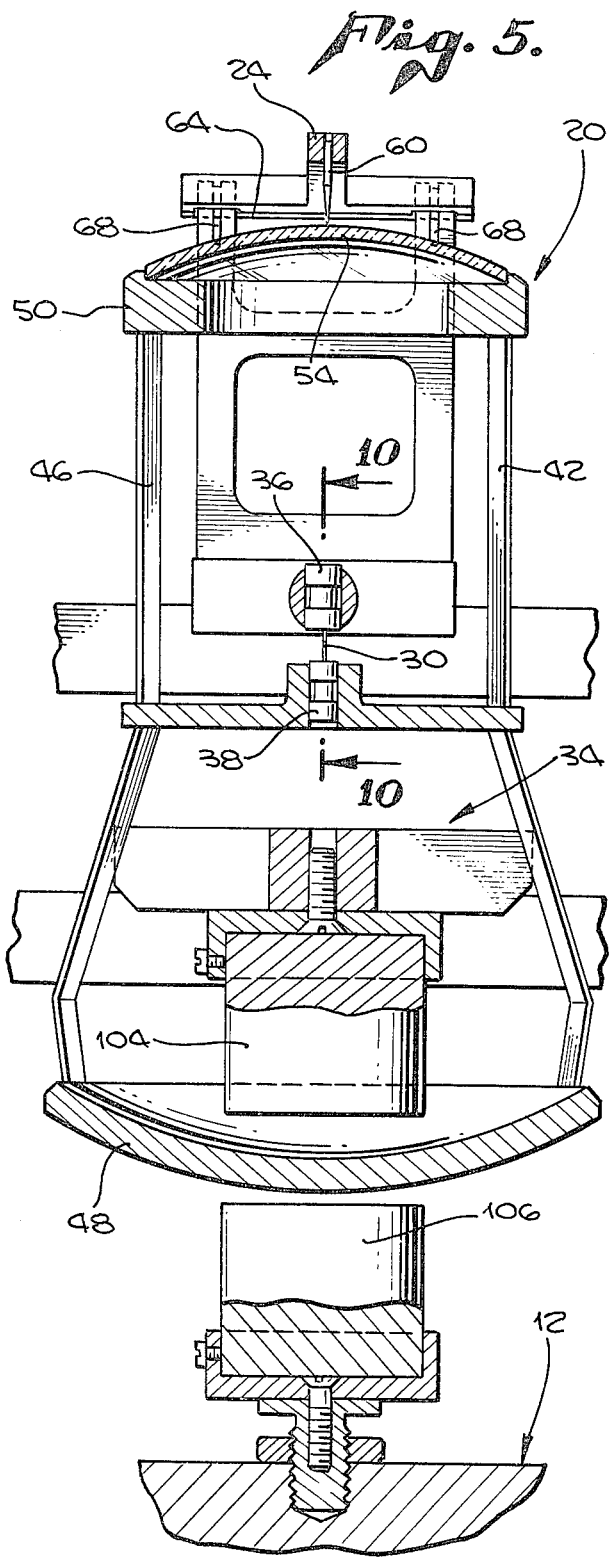
FIG. 5 is a cross-sectional view taken along line 5—5 in FIG. 1.

Referring particularly to the drawings, there is illustrated generally at 10 an earthquake recording device which includes a base 12 and a hood 14. Hood 14 is provided with a transparent window 16 so as to permit the inspection of the device without removing the cover. A first compound pendulum 18 is operatively associated with a first stylus arm 22, and second compound pendulum 20 is operatively associated with second stylus arm 24. A timing mechanism is indicated generally at 26, and a trip for timing mechanism 26 is indicated generally at 28.

The pendulums 18 and 20 are identical in structure. For this reason only one pendulum will be described, and the reference numerals for like elements will be the same on each pendulum.

Base 12 is intended to be affixed rigidly to the supporting structure. The compound pendulums are suspended at a single point from a wire 30. The support arm 32 for the suspension wires 30 is rigidly mounted to the supporting structure indicated generally at 34 which is in turn mounted to base 12. The entire supporting structure from base 12 through supporting structure 34 and support arm 32 is rigid so that motion imparted to base 12 will be transmitted accurately to the point at which suspension wires 30 are attached to support arm 32. Suspension wires 30 are mounted in adjustable blocks 36 and 38. The adjustable blocks 36 and 38, see particularly FIG. 10, permit the natural frequency of the respective compound pendulums to be adjusted as desired. The adjustable block 38 is mounted in a support plate 40 which is in turn mounted to vertical pendulum cage elements 42, 44, and 46. The lower pendulum element is a damping pan 48. The upper pendulum cage element is a lens support ring 50. Removable arcuate lenses 52 and 54 are removably received in lens support rings 50. The lenses 52 and 54 are mounted in rings 50 so that they are convex toward their respective stylus arms. A layer 56 (see FIG. 11) of suitable coating material is applied to the convex surface of the lenses 52 and 54 so that the respective stylus points 58 and 60 will leave a clear sharp tracing as they move over the surfaces of the lenses in response to a shock. The tracings produced by the stylus points utilizing a timing mechanism according to the present invention are exemplified by FIG. 3. The action of the timing mechanism 26 lifts the stylus point from the convex surface of the lens at regular intervals so that a broken tracing is produced which contains within itself a time scale. According to the present invention, two tracings are produced for each shock, one of which is on a more magnified scale, by reason of the natural frequencies of the respective pendulums having been established at different values. The tracing illustrated in FIG. 4 is typical of that produced by prior art devices, wherein no time scale is provided and only one recording pendulum is used. Devices of this type are described by Hudson, D. E. "The Wilmot Survey Type Strong-Motion Earthquake Records," *A Report On Research Conducted Under the Grant From the National Science Foundation, Pasadena, California,* 1958.

The respective stylus arms 22 and 24 are mounted for two dimensional movement on knife edge elements 62 and 64. Knife edge elements 62 and 64 are mounted for pivotal movement in the V-shaped openings in bearing blocks 66 and 68. Counterbalance weights 70 and 72 are adjustably mounted on the ends of the stylus arms which are remote from the stylus points. These counterbalance weights 70 and 72 perform the functions of lightening the contact between the stylus points and the convex surface of the respective lenses as well as serving as anvils for striker 74. Striker 74 is mounted on timing arm 76. Timing arm 76 is actuated by timing mechanism 26. When timing mechanism 26 is actuated, the timing arm 76 moves up and down as indicated particularly in FIG. 2 striking the counterbalance weights 70 and 72 so as to lift the stylus points 58 and 60 free from contact with the convex surface of the lenses at regular predetermined intervals. In one preferred embodiment the striker 74 strikes the counterweights 70 and 72, each one twentieth of a second. The details of the timing mechanism 26 are not illustrated. Timing mechanism 26 is generally a conventional clock mechanism containing a dry cell which produces sufficient current to cause the actuation of the clock mechanism in response to a signal received from timing mechanism trip 28.

Figure 7:
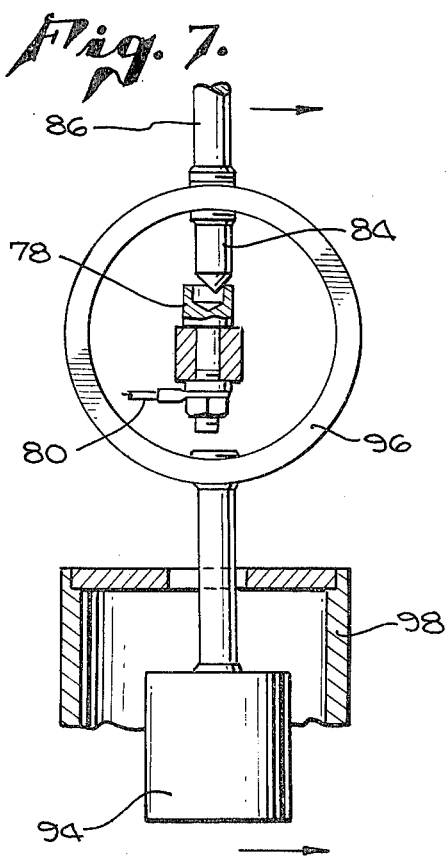
FIG. 7 is a view similar to FIG. 6 showing the device in the actuated configuration.

Timing mechanism trip 28, see for example FIGS. 2, 6, and 7, is in the preferred form a switch which is caused to close so as to complete an electrical circuit when subjected to a substantial physical shock. The stationary contact element 78 is connected by an electrically conductive lead 80 to a first terminal 82 in timing mechanism 26. Movable contact element 84 is connected through arm 86, support wire 88, and electrically conductive lead 90 to second terminal 92 in timing mechanism 26. Trip weight 94 is suspended from arm 86 through ring 96. Trip weight 94 is enclosed in shield 98 so that it is not subject to being set in motion by a breeze blown against it. When the device is in a quiescent state, the contact elements 78 and 84 are in the open relationship shown in FIG. 6. When the device receives a shock such as that which occurs in an earthquake, the weight 94 moves as shown in FIG. 7 and contacts 78 and 84 are brought together so as to close the circuit and cause the activation of timing mechanism 26.

The movement of the pendulums 18 and 20 is damped. Eddy current damping is provided by damping pans 48, which are preferably aluminum, in coaction with magnets 100, 102, 104, and 106. Damping can be adjusted by varying the gap between the poles of the permanent magnets.

In operation the earthquake recording device 10 is mounted to a structure or to the ground by firmly and rigidly attaching a base 12 to the structure or to a concrete block sunk in the ground. The hood 14 is placed over the functional part of the device and is locked in place. If seismic activity occurs, the smoked convex lenses 52 and 54 are checked by observation through transparent window 16 to see if a recording has been made. If a recording has been made, the hood 14 if removed; a photographic record of the recording is made, and the lenses are resmoked and replaced in the device. The hood is then closed, and except for possibly rewinding the clock mechanism in the timing mechanism and replacing the battery, the unit is again ready for operation.

When a shock of sufficient magnitude to activate the device is experienced, the pendulums began to swing and trip weight 94 also swings under the impact of the shock. Contacts 78 and 84 are closed so that the completed electrical circuit causes the activation of timing mechanism 26. The striker 74 then begins to impact the counterbalance weights 70 and 72 at predetermined intervals of time. As the pendulums swing the pointed scribes 58 and 60 trace the movement of the pendulums and record the time intervals between the impacts delivered by striker 74 to counterbalance weights 70 and 72.

When the results of the earthquake have dissipated, the pendulums are damped into quiescence by the permanent magnets 100, 102, 104, and 106. If desired, the timing mechanism 26 may be arranged so that when it has run down, the striker 74 will rest on the counterbalance weights 70 and 72, thus withdrawing stylus pointers 58 and 60 from contact with the lenses 52 and 54. In this way after shocks will not obliterate the record made by the initial earthquake.

The ease of maintenance, simplicity of construction, and relatively low cost of earthquake recording devices according to the present invention makes it possible to distribute a great number of these devices both in structures and elsewhere throughout earthquake prone areas. In this way a great deal of very valuable earthquake engineering information can be obtained, which will enable the construction of structures which are safer under earthquake conditions.

As will be understood by those skilled in the art, what has been specifically described are preferred embodiments in which changes may be made without departing from the spirit and scope of the accompanying claims.

I claim:

1. A shock recording device comprising:
   a base;
   a first compound pendulum mounted to said base and having a first natural frequency;
   a second compound pendulum mounted to said base and having a second natural frequency;
   means for independently recording the movement of said first and second compound pendulums in response to a shock; and
   timing means for enabling said means for recording to record the passage of predetermined time intervals during said movement.

2. A shock recording device of claim 1 including a shock sensitive switch element for actuating said timing means responsive to a shock of a predetermined magnitude.

3. A shock recording device of claim 1 wherein said means for recording includes a stylus normally resting on the surface of a lens, said surface being coated with a recording material and said lens being mounted for movement with said first compound pendulum.

4. A shock recording device of claim 3 wherein said timing means includes a clock mechanism which delivers timed impulses to said stylus to lift said stylus clear of said surface at predetermined time intervals.

5. A shock recording device comprising:
   a base;
   a compound pendulum mounted to said base and having a natural frequency;
   means for recording the movement of said compound pendulum in response to a shock; and
   timing means for enabling said means for recording to record the passage of predetermined time intervals during said movement.

6. An earthquake recording device comprising:
   a base;
   a first magnetically damped compound pendulum mounted on said base and having a first natural frequency;
   a second magnetically damped compound pendulum mounted on said base and having a second natural frequency, said second natural frequency being different from said first natural frequency; and
   means for recording the movement of the respective said compound pendulums and the passage of predetermined time intervals during said movement.

* * * * *